Patented Jan. 18, 1944

2,339,362

UNITED STATES PATENT OFFICE 2,339,362

TREATMENT OF OLEFIN-SULPHUR DIOXIDE RESINS

Robert D. Snow, Bartlesville, Okla., assignor to Phillips Petroleum Company, a corporation of Delaware No Drawing. Application July 28, 1941, Serial No. 404,427

9 Claims. (Cl. 260—94.5)

This invention relates to methods of treating olefin-sulphur dioxide resins for effecting purification and improving the transparency and stability of moldings made therefrom. More particularly it relates to treatment of granular or pulverulent olefin-sulphur dioxide resins with vapors of an organic solvent.

Methods of making resins by combination of olefinic compounds with sulphur dioxide in substantially equimolecular quantities in the presence of catalysts or by means of actinic light are well known in the art. Generally, it is advantageous to use some excess sulphur dioxide in the reaction mixture. Frequently, small quantities, at least of the olefin, remain unreacted after the reaction has practically stopped. In addition to the unreacted olefin and excess sulphur dioxide existing in the final reaction mixture, the resin is often contaminated with small percentages of relatively unstable materials of lower molecular weight than the desirable resin. Catalyst residues, and reaction products, may also be present. When the pressure on the resulting mixture is released, the volatile hydrocarbons and a large part of the excess sulphur dioxide escape quite readily. However, most of the resins, particularly those of straight-chain olefinic hydrocarbons such as 1- or 2-butene and 1- or 2-pentene have considerable affinity for sulphur dioxide and tend to retain small quantities of it within the mass of resin even after the resin outwardly appears hard and free of solvents and gases. The liberation of very volatile materials such as sulphur dioxide is obviously facilitated at this stage by fine grinding, but traces of sulphur dioxide tend to be retained within even the finest particles, and catalyst residues and relatively non-volatile but thermally unstable impurities, when present, tend to be retained throughout the resin. If these impurities are allowed to remain in the resins until the resins are molded, they apparently cause some discoloration by decompostion during the molding procedure, and result in more or less opacity as a result apparently of the formation of minute gas bubbles. The mechanical strength of the molded product is also affected adversely. It is believed that these unstable impurities are at least partly responsible for the crazing and clouding of molded articles and lacquer films of these resins which sometimes develop on aging, particularly in sunlight.

An object of this invention is to provide a means of treating crude olefin-sulphur dioxide resins to give a product of improved stability, particularly in the molded form.

Another object of this invention is to improve the clarity and transparency of moldings and films of olefin-sulphur dioxide resins.

Another object of this invention is to improve the welding of particles of olefin-sulphur dioxide resins during the molding operation.

A further object of this invention is to produce a molding material substantially free from sulphur dioxide or other compounds which would corrode or discolor tool steel commonly used for molds and dies.

A still further object of this invention is to produce a molding compound from a crude olefin-sulphur dioxide resin which can be transformed by heat and pressure or equivalent methods into transparent or translucent articles substantially free from gas bubbles, unreacted hydrocarbons, dirt, and/or other foreign matter.

Other objects and advantages of the invention will be apparent from the accompanying disclosure and description.

The objects of this invention may be accomplished by treating a crude olefin-sulphur dioxide resin in finely divided solid form with a stream of air or other common inert gas such as nitrogen, carbon dioxide, combustion gas, etc., carrying vapors of an organic compound or material which will penetrate the resin particles and swell and soften them. The organic materials which may be used are either single compounds or mixtures which, when contacted in the liquid form with the granular resin, will dissolve or at least swell and soften the resin granules. Only a limited number of organic materials exert a strong solvent effect upon the resins. The impurities, on the other hand, are soluble in most organic solvents. Consequently the suitability of any particular organic material for treating a particular olefin-sulphur dioxide resin can be ascertained by a simple test. Since the resins made from different olefinic materials vary greatly in their solvent requirements, the same treatment will not fit all resins.

Ethylene-sulphur dioxide resin is insoluble in all common organic solvents and is therefore not readily amenable to the processes of this invention. Propylene-sulhpur dioxide resin is affected very little by the common volatile solvents but is swelled appreciably by phenol, cresols, chlorphenol, eugenol and similar phenolic compounds. 1-butene-sulphur dioxide resin is swelled and dissolved by liquid 1,4-dioxane, nitromethane and to a lesser extent by acetone, and it is swelled considerably by chloroform, methylene chloride, tetrachloroethane, and trichloroethylene. As the molecular weight of the 1-olefin increases, the resins become more soluble in organic solvents and a greater variety of compounds including common alcohols, halides, ketones, etc., may be used. In general, resins from 2-olefins have noticeably less affinity for a given organic solvent than those from the corresponding 1-olefin, and resins from branched-chain olefins, such as isobutylene and isopropyl ethylene, are still less affected by solvents. The process can also be applied to sulphur dioxide resins of poly-functional olefinic compounds such as allyl alcohol and allyl chloride, and resins formed by the reaction of other unsaturated organic compounds and sulphur dioxide, which are known to the art. The term olefin-sulphur dioxide resin is intended to include such other resins, as well as those formed from materials which are strictly olefin hydrocarbons.

While the behavior of the liquid organic solvent, which may dissolve or merely swell the resin, indicates its suitability for use in the process, my invention does not comprise the liquid-phase treatment of the resin with this swelling and softening agent, but contemplates instead the treatment of the solid resin with vapors of the organic solvent or swelling agent in such concentrations that the resin is softened and swelled, but insufficiently so to permit agglomeration or coalescence of particles during the treatment. The partial pressure of the organic vapors in the treating medium will therefore have to be less than the vapor pressure of the liquid at the temperature of treatment. An important function of the vapor treatment is to soften the hard outer case of the resin particle thereby facilitating the escape of entrapped gases and vapors from the interior of the particle.

In practicing the process, usually a stream comprising an inert gas saturated with an organic solvent in the vapor phase is passed through a chamber containing crude resin to be treated. It is preferable to carry out the treatment at a somewhat elevated temperature for the purpose of decomposing thermally unstable materials contained in the crude resin. Such unstable materials may amount to as much as a few tenths of one per cent to perhaps 5 to 7 per cent of the mass of the resin. Although the reason is not known with certainty, the presence of the solvent apparently facilitates decomposition of these thermally unstable materials and escape of the products of such decomposition. In any event, entrapped gases and vapors together with other undesirable material contained within the crude resin particles are satisfactorily removed. At the end of the treatment a gas free from organic solvent vapor may be passed through or over the resin to remove substantially all of the organic treating material. However, I have found that subsequent molding is often greatly enhanced if minor concentrations of the organic treating material are allowed to remain distributed within the resin in a more or less uniform condition. I prefer to carry out my process in this manner and this is a modification of my invention.

The treatment of this invention is conveniently conducted at elevated temperatures but may be carried out at ordinary temperatures if desired. Obviously, however, temperatures at which marked solution and/or decomposition of resin are apparent during the time of treatment are not desirable. Although temperatures in the range of 30 to 250° C. can be advantageously applied to my process, for the treatment of most resins I prefer to employ temperatures in the range of 50 to 180° C., the selected temperature depending to a great extent on the composition of the resin.

The duration of heating required to effect satisfactory treatment is dependent on the characteristics of the resin, the fineness of granulation, and the temperature. Usually a period of heating of two to thirty hours is sufficient with a temperature of about 100 to 150° C. when the resin is granulated to an average particle size of about one sixtieth of an inch. High temperatures and fine sub-division of granules shorten the time required for satisfactory treatment, while lower temperatures and coarse granules increase the time.

The total pressure under which the above treatment is performed may vary over a wide range as long as the organic solvent is maintained in the vapor phase, and does not form true liquid phase on or within the resin particles. Therefore, at any temperature of treatment below the softening temperature of the resin the partial pressure of the organic agent to which the mass of crude resin is subjected must be below the vapor pressure of that organic agent at the temperature of treatment. Ordinarily, the partial pressure of the organic swelling agent need be maintained but little below its vapor pressure at the temperature of treatment. If the resin particles have marked adsorptive properties, a somewhat lower partial pressure may need to be employed.

The removal of volatile impurities from the crude resin may also be accomplished by substantially or entirely dispensing with the use of a carrier gas. This method comprises placing the granular or pulverized crude olefin-sulphur dioxide resin in an enclosed container, pumping out by means of a vacuum pump to a suitable reduced pressure and maintaining this pressure while pumping by injection of vapors of a suitable organic swelling agent, the partial pressure of said swelling agent being sufficient to soften and swell the resin particles without substantial agglomeration of the particles and the temperature being held within the preferred range. Agitation may be used if desirable. After removal of thermally unstable materials and other occluded impurities originally held in the crude resin, the injection of a vaporous organic softening agent is stopped and the pressure is lowered by pumping until most of the softening agent has been removed. As an alternative manner of operating this method a current of gas may be used to remove excess organic solvent at pressures nearer atmospheric pressure if desired.

In some instances it has been found that a liquid-phase extraction of the finely ground crude resin granules with a substantially nonswelling solvent such as methanol or ethanol or their mixtures with benzene can be effectively applied preceding the vapor or gas-vapor treatment. Such pretreatment affords a desirable preparation of the crude resin granules for the subsequent action of the organic solvent vapor in that the amount of time required for said subsequent treatment is appreciably reduced.

Conventional apparatus for treatment according to this invention or for drying may be used for my process. For example, vapor or gas-vapor mixtures may be passed upward through a mass of the finely ground crude resin, with or without agitation, or the treatment may be carried out in a rotating cylinder having its axis in a horizontal plane or slightly inclining thereto. However, this invention is not limited to the use of any specific apparatus.

Fine grinding of the crude resin before treatment with organic solvent vapors according to this invention is advantageous insofar as it facilitates permeation of the resin particles by the vapors and escape of gaseous impurities and decomposition products. Excessive pulverization, on the other hand, is disadvantageous on account of high resistance to gas flow and entrainment of resin particles. Grinding to pass an 80 to 100-mesh screen is satisfactory in most cases.

Methods of carrying out my invention are disclosed in the following examples which are merely illustrative both as to the specific olefin-sulphur dioxide resins to which the invention can be applied and to the particular organic solvent selected for treating the resin and are not to be considered as necessarily limiting the scope of my invention.

*Example I*

A mixture of two pounds of 2-butene, one pound of 1-butene, and six pounds of sulphur dioxide were reacted in the presence of lithium nitrate. After evaporation of most of the unreacted sulphur dioxide and unreacted butenes a solid resin separated. The crude resin so obtained was ground to a 40- to 80-mesh size and placed in a vertical cylindrical container. A stream of air, saturated with acetone vapor at 40° C., was passed through this column of crude resin while it was held at 50° C. for about 24 hours, after which warm dry air was passed through for about 4 hours to remove substantially all of the acetone vapors. A test sample of the purified resin then gave a transparent, colorless, coherent article when compression-molded. A test sample of the crude resin before treatment with acetone vapors gave an opaque article when compression-molded under the same conditions.

*Example II*

A mixed butene-sulphur dioxide resin, made as in Example I, was treated at 120° C. with vapors of 1,4-dioxane for 15 hours at a pressure of one atmosphere. After this period of treatment the pressure was reduced to 100 millimeters of mercury for three hours at 120° C. The purified resin obtained in this manner was substantially free from occluded gas bubbles and when compression-molded gave a clear, colorless article of improved stability in its molded form.

Having thus described my invention I claim:

1. In a process for the production of an olefin-sulphur dioxide resin, the improvement which comprises treating said resin with vapors of an organic solvent which in liquid phase is capable of dissolving or swelling said resin, in the absence of a liquid phase, under such conditions of temperature, pressure and time of contact as to produce softening and swelling of the resin particles but insufficient to produce substantial agglomeration of the resin particles.

2. In a process for the production of an olefin-sulphur dioxide resin, the improvement which comprises passing vapors of an organic solvent in contact with said resin at a temperature within the range of approximately 50° to 180° C. and at such partial pressure that the resin particles are softened and swelled but not substantially agglomerated, said organic solvent being capable of dissolving or swelling the resin when used in liquid phase.

3. A process for the purification of an olefin-sulphur dioxide resin containing undesirable constituents, which comprises treating said resin in a pulverulent condition at a temperature within the range of approximately 50° to 180° C. with vapors of an organic solvent in such amount that the resin particles are softened and swelled but are not substantially agglomerated, said organic solvent being capable of dissolving or swelling the resin when used in liquid phase, and thereafter removing at least a portion of the vapors of the organic solvent from the resin thus treated.

4. A process for improving the molding properties and stability of an olefin-sulphur dioxide resin, which comprises passing a stream of an inert gas carrying vapors of an organic compound in contact with said resin under such conditions of temperature, pressure and time of contact as to produce softening and swelling of the resin particles but insufficient to produce substantial decomposition of the resin or substantial agglomeration of the resin particles, said organic compound being capable of dissolving or swelling the resin when used in liquid phase, and thereafter removing at least a portion of the vapors of the organic compound from the purified resin.

5. A process for improving the molding properties and stability of an olefin-sulphur dioxide resin, which comprises treating said resin in a granular condition with vapors of an organic agent which in liquid phase is capable of dissolving or swelling said resin, said treatment being conducted at a temperature above approximately 30° C. and below the temperature at which said resin undergoes any substantial decomposition or the resin particles undergo any substantial agglomeration.

6. A process for improving the molding properties and stability of an olefin-sulphur dioxide resin, which comprises treating said resin in a granular condition with vapors of an organic agent which in liquid phase is capable of dissolving or swelling said resin, said treatment being conducted at a temperature above approximately 30° C. and below the temperature at which said resin undergoes substantial decomposition, the pressure of said vapors at the temperature of treatment being below that which produces substantial agglomeration of said resin granules and below that which produces a liquid phase, and thereafter freeing said treated resin from said organic agent.

7. A process for improving the molding properties and stability of an olefin-sulphur dioxide resin, which comprises treating said resin in a granular condition with vapors of 1,4-dioxane under such conditions of temperature, pressure and time of contact as to produce softening and swelling of the resin particles but insufficient to produce substantial agglomeration of the resin particles.

8. A process for improving the molding properties and stability of an olefin-sulphur dioxide resin, which comprises treating said resin in granular condition with vapors of nitromethane under such conditions of temperature, pressure and time of contact as to produce softening and swelling of the resin particles but insufficient to produce substantial agglomeration of the resin particles.

9. A process for improving the molding properties and stability of an olefin-sulphur dioxide resin, which comprises treating said resin in a granular condition with a stream of air carrying acetone vapors under such conditions of temperature, pressure and time of contact as to produce softening and swelling of the resin particles but insufficient to produce substantial agglomeration of the resin particles.

ROBERT D. SNOW.